United States Patent [19]

van Aspert

[11] Patent Number: 4,705,303

[45] Date of Patent: Nov. 10, 1987

[54] DETACHABLE HOSE COUPLING

[75] Inventor: Joan J. A. M. van Aspert, Berlicum, Netherlands

[73] Assignee: Askove Kunststof Industrie B.V., Netherlands

[21] Appl. No.: 883,981

[22] Filed: Jul. 10, 1986

[30] Foreign Application Priority Data

Jul. 10, 1985 [NL] Netherlands .......................... 8501972

[51] Int. Cl.$^4$ ............................................ F16L 37/00
[52] U.S. Cl. .................................... 285/309; 285/312;
285/320; 285/322; 285/338
[58] Field of Search ................ 285/312, 311, 310, 309, 285/308, 320, 338, 322, 170

[56] References Cited

U.S. PATENT DOCUMENTS

| | | |
|---|---|---|
| 2,238,257 | 4/1941 | Fisher . |
| 2,991,091 | 7/1961 | DeCenzo .......................... 285/338 X |
| 3,048,428 | 8/1962 | Ransom ........................... 285/338 X |
| 3,484,121 | 12/1969 | Quinton ........................... 285/322 X |

FOREIGN PATENT DOCUMENTS 1135749 11/1982 Canada .
489266 1/1930 Fed. Rep. of Germany .

*Primary Examiner*—Richard J. Scanlan, Jr.
*Attorney, Agent, or Firm*—Stetina and Brunda

[57] ABSTRACT

A coupling for rapidly and detachably connecting a conduit pipe or hose to an opening is disclosed provided with an inner sleeve having a flange on at least one end, an outer sleeve capable of moving with little play about the inner sleeve, a groove for a flexible sealing member between the coupling and the opening to be connected as well as clamping means for the relative axial movement of inner and outer sleeve and for pressing the sealing member tightly into the opening, whereby the inner sleeve is provided near the flange with an inclined ascending face which can mate with a corresponding ascending face at the outer sleeve, the outer sleeve being furnished with a groove arranged all around it for accommodating a sealing ring, while at least the part of the outer sleeve in the zone of the nest for the sealing ring is capable of flexible radial expansion, in such a way that, upon the ascending face of the outer sleeve being pressed against the ascending face at the inner sleeve under the action of the clamping means, the sealing ring is thrust out radially.

9 Claims, 4 Drawing Figures

DETACHABLE HOSE COUPLING

BACKGROUND OF THE INVENTION

The present invention relates to a coupling for rapidly and detachably connecting a conduit pipe or hose to an opening, provided with an inner sleeve having a flange on at least one end, an outer sleeve capable of moving with little play about the inner sleeve, a groove for a flexible sealing member between the coupling and the opening to be connected, as well as clamping means for the relative axial movement of inner and outer sleeve and for pressing the sealing member tightly into the opening.

In known types of such couplings, a rubber ring is fitted between a flange on the inner sleeve and a flange on the outer sleeve, in such a way that, upon the inner sleeve being moved relatively toward the outer sleeve, the rubber ring is subjected to axial pressure, causing it to be thrust out radially through elastic deformation.

Such a coupling has been found not to ensure a satisfactory seal in all conditions, and specifically not to be resistant to high axial forces.

SUMMARY OF THE PRESENT INVENTION

The present invention aims at providing an improved and simple coupling of the kind stated in the preamble.

To this end, it is proposed that the inner sleeve in such a coupling be provided near the flange with an inclined ascending face which can mate with a corresponding ascending face at the outer sleeve, the outer sleeve being furnished with a groove arranged all around it for accommodating a sealing ring, while at least the part of the outer sleeve in the zone of the groove for the sealing ring is capable of flexible radial expansion, in such a way that, upon the ascending face of the outer sleeve being pressed against the ascending face at the inner sleeve under the action of the clamping means, the sealing ring is thrust out radially.

Such a coupling offers the advantage that, when the inner sleeve is subjected to elevated axial forces, the radial outward force upon the sealing ring is increased, thus ensuring reliable sealing and clamping action. The coupling can nevertheless be detached rapidly in a simple manner by moving the outer sleeve relatively to the inner sleeve in the opposite direction.

DESCRIPTION OF THE DRAWINGS

Furthur details of the invention will become evident from the following description of a preferred embodiment and reference to the drawings WHEREIN.

DETAILED DESCRIPTION OF THE PREFERRED EMBODIMENT

Figure 1:
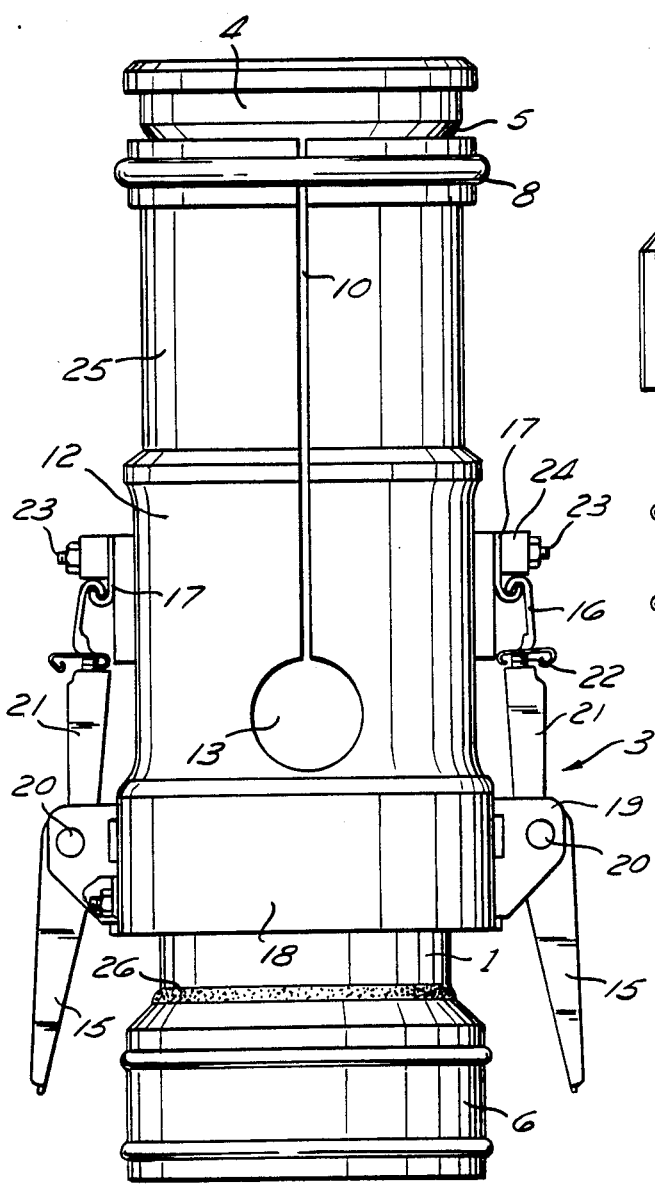
FIG. 1 is a lateral view of a coupling according to the invention.
Figure 2:
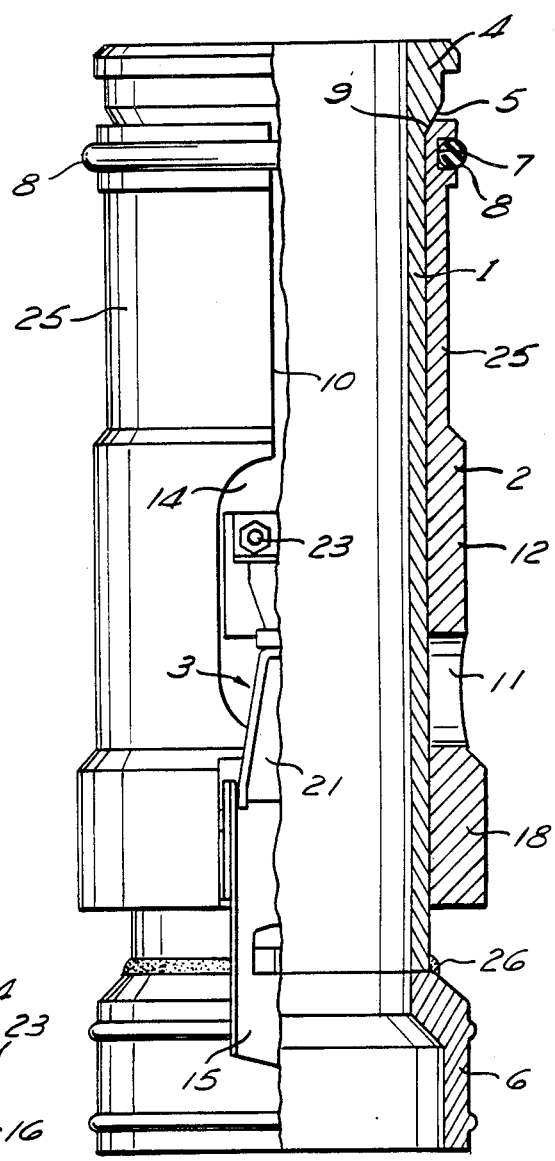
FIG. 2 is a similar view, but turned through an angle of 90 deg., and shown partly in longitudinal section.

Referring to the figures, the coupling of the present invention consists of an inner sleeve 1, an outer sleeve 2, and clamping means designated by the overall reference number 3. The inner sleeve 1 is provided, at its end which is designed as the inserting end, with a flange 4, as well as, on the side of this flange 4 which faces away from the inserting end, with an ascending face 5. The inner sleeve 1 is provided at its other end with a connecting end 6, to which a hose can be fitted in a known manner.

The outer sleeve 2 is provided, at its end facing the flange 4 of the inner sleeve 1, with a groove 7 for an O-ring 8. The outer sleeve 2 is provided at its end with an ascending face 9, corresponding to the ascending face 5 of the inner sleeve 1. The outer sleeve 2 is furthermore furnished with at least one slot 10 extending axially up to the ascending face 9. At its end facing away from the ascending face 9, this slot 10 opens into an enlarged bore 11 in the body 12 of the outer sleeve. In the preferred embodiment according to the invention as shown in the figures, four bores 11 are provided in the outer sleeve 2. These bores consist of two diametricallly opposite round bores 13 and of two likewise diametrically opposite, elongated bores 14 arranged at right angles to the round bores 13. The clamping means 3 are fastened on the inner sleeve through these elongated bores 14.

The clamping means 3 are constituted by two diametrically opposite levers 15, hinged to the outer sleeve 2, with clamping hooks 16, as well as by diametrically opposite hooked parts 17 mounted on the inner sleeve 1 and projecting through corresponding openings 14 in the outer sleeve 2. The outer sleeve 2 is provided with a boss 18, on which two diametrically opposite pairs of bearing supports 19 are secured for the pins 20. The levers 15, supported on these pins 20, act as self-locking clamping levers for clamping rods 21 that are provided with clamping hooks 16. The length of the clamping means 3 can be adjusted by means of a threaded setting device 22. The clamping hooks 16 mate with corresponding hooked parts 17. These hooks 17 are fixed by means of bolts 23 and mounting brackets 24 on the inner sleeve 1, through the elongated bores 14 in the outer sleeve 2.

The openings 10 cause the outer sleeve 2 to be divided at its one end into four flexible parts 25, so that, upon the ascending face 9 at the outer sleeve 2 being pressed against the ascending face 5 at the inner sleeve under the action of the clamping means 3, the parts 25 move outwardly from the end of the outer sleeve 2, thereby clamping the O-ring 8 radially against the inside of the opening 27 (shown in FIG. 3) into which the inserting end of the coupling is pressed. Force applied to the coupling from the inserting end results in the ascending face 5, 9 being pressed more firmly against each other, and thus in increasing the clamping force of the O-ring 8 in the opening. The force on O-ring 8 is also sufficient to force it into the openings 10 and against the inner sleeve 1. The compressed O-ring 8 seals against both the inner sleeve 1 and opening 27 (shown in FIG. 3) producing a tight connection.

Figure 3:
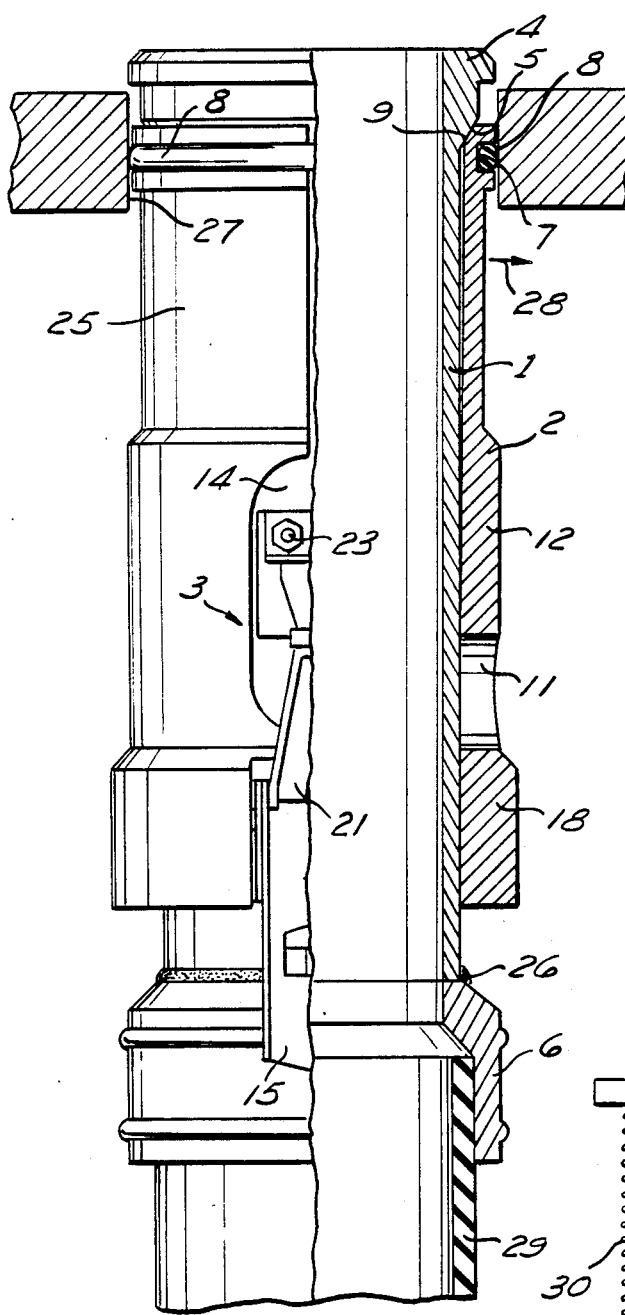
FIG. 3 is an equivalent view to FIG. 2 showing the coupling of the present invention in use for connecting to an opening.

The coupling of the present invention in use for connecting to an opening 27 is shown in FIG. 3. With respect to the connection of the coupling to the opening 27, first the outer sleeve 2 should be placed in the opening 27, then the inner sleeve 1 should be moved in the outer sleeve 2. When the inner sleeve 1 is then subjected to axial force, then the radial outward force upon the sealing ring increases, ensuring reliable sealing and clamping action.

The radially outward movement of outer sleeve 2, albeit slight, is illustrated in FIG. 3 as may be particularly observed from the compression of sealing ring 8. Also in FIG. 3 an arrow 28 indicates in which direction the outer sleeve parts 25 are moved when the ascending face 9 at the outer sleeve is pressed against the ascending face 5 at the inner sleeve under the action of the clamping means 3. By means of the moving of the parts 25, the O-ring 8 retains the coupling within an opening 27. The conduit pipe, or hose 29 to which the coupling connects at its other end is also shown in FIG. 3.

In the example of embodiment according to the invention, as shown in the figures, the inner sleeve, at its end facing away from the ascending face, is directly connected to a pipe or hose, 29 as shown in FIG. 3. The connecting part 6 is only connected to the remaining part of the inner sleeve 1 after the outer sleeve 2 is fitted on the inner sleeve 1. This connection is made by means of a welded seam 26. The outer sleeve 2 naturally can be composed equally well of two or more parts which, having been assembled with the inner sleeve 1, can be jointed in a prior-art manner.

The coupling is specifically designed for a rapidly detachable joint, such as for a cooling unit to be connected to aircraft and the like when external cooling must be applied, for example when the aircraft engines themselves are inoperative. The inside diameter of the inner sleeve 1 usually amounts to 70 mm. Use is preferably made of ultraviolet-resistant high-density polyethylene for the inner and the outer sleeve.

Figure 4:
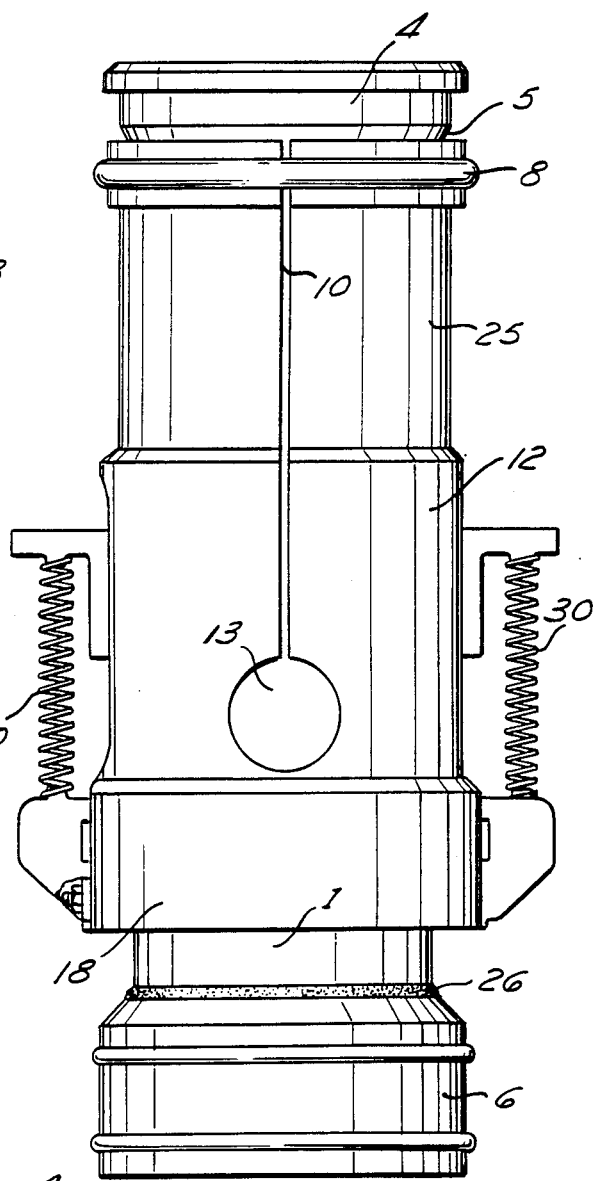
FIG. 4 is an equivalent view to FIG. 1 showing the substitution of springs for clamping means within the coupling of the present invention.

It is to be noted that, instead of the clamping means shown, use can also be made of expanded and stretched pressure springs 30, as shown in diagrammatic represntation in FIG. 4, between the end 6 of the inner sleeve 1 and the thickened end 18 of the outer sleeve 2, in such a way that the outer sleeve is constantly pressed in the direction of the ascending face of the inner sleeve. In such case provisions will have to be made, with the use of a manual or other arrangement, for moving the outer sleeve 2 in the opposite direction relatively to the inner sleeve 1 when the coupling is to be detached.

Besides the example of embodiment according to the invention described hereinabove for a clamping zone on one side, it is also possible to equip the coupling on both sides with a corresponding O-ring seal, so that a double-sided connector is obtained. In such case, the connecting part 6 for the conduit pipe or hose is not provided, the coupling being so designed with respect to the median normal plane that the inner sleeve possesses on both ends a flange with an inclined ascending face, and that the outer sleeve consists of two parts, each of these parts, for mating with one of the flanges, being provided with an ascending face and a groove nest for a sealing ring, as well as with slots that extend axially up to the end. It is also possible, however, for the outer sleeve to constitute one whole part, and for the inner sleeve to consist of several parts.

What is claimed is:

1. A coupling for rapidly and detachably connecting a conduit pipe or hose to an opening comprising:
    an inner sleeve having a flange on at least one end; and
    an outer sleeve capable of moving with little play about the inner sleeve; and
    a flexible sealing ring between the outer sleeve and the opening to be connected; and
    clamping means for clamping the relative axial movement of inner and outer sleeve and for indirectly pressing the sealing ring tightly into the opening; and
    the inner sleeve being provided near the flange with an inclination ascending face which mates with a corresponding ascending face at the outer sleeve, the outer sleeve being furnished with a groove arranged all around it for accommodating the sealing ring, while at least the part of the outer sleeve in the zone of the groove for the sealing ring is capable of flexible radial expansion in such a way that, upon the ascending face of the outer sleeve being pressed against the ascending face at the inner sleeve under the action of the clamping means, the sealing ring is thrust out radially and pressed tightly into the opening.

2. The coupling according to claim 1, wherein the outer sleeve is furnished with at least one slot extending axially up to the ascending face.

3. The coupling according to claim 2, wherein the slot, at its end facing away from the ascending face, opens into an enlarged bore in the body of the outer sleeve.

4. The coupling according to claim 3, wherein the clamping means are constituted by two diametrically opposite levers, hinged to the outer sleeve, with clamping hooks, and by diametrically opposite hooked parts mounted on the inner sleeve and projecting through corresponding openings in the outer sleeve.

5. The coupling according to claim 4, wherein the inner sleeve, at its end facing away from the ascending face, is directly connected to a hose or pipe.

6. The coupling according to claim 5, wherein both the inner sleeve and the outer sleeve are manufactured of ultraviolet-resistant high-density polyethylene.

7. The coupling according to claim 3, wherein the clamping means comprise springs which press the outer sleeve with its ascending face in the direction of the ascending face of the inner sleeve.

8. The coupling according to claim 7, wherein the inner sleeve possesses on both ends a flange with an inclined ascending face, and that the outer sleeve consists of two parts each for mating with one of the flanges, each being provided with an ascending face and a groove for a sealing ring, as well as with slots that extend axially up to the end.

9. A coupling device for connecting a conduit to an opening comprising:
    a rigid tube affixed to the conduit end, the tube having a flange and having an outer circumferential inclination-ascending face;
    a sleeve on the tube, the sleeve having circumferential groove and having an inner circumferential inclination-ascending face which is complementary to the tube face, the sleeve being capable of moving axially with little play about the tube and being capable of flexible radial expansion in the zone of the groove;
    a flexible sealing ring within the sleeve's outer circumferential groove; and
    clamping means for effecting and for clamping relative axial movement between the tube and sleeve in order that, the ascending face of the sleeve being pressed against the ascending face of the tube under action of the clamping means, the sealing ring is thrust radially outwards and is tightly pressed into a circumferentially surrounding opening simultaneously that the tube flange is drawn backwards in a direction from the opening and is tightly pressed against the shoulders of the opening, forming thereby a connection.

* * * * *